United States Patent
Hardacker et al.

(10) Patent No.: US 8,645,983 B2
(45) Date of Patent: Feb. 4, 2014

(54) SYSTEM AND METHOD FOR AUDIBLE CHANNEL ANNOUNCE

(75) Inventors: Robert Hardacker, Escondido, CA (US); Steven Richman, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 885 days.

(21) Appl. No.: 11/858,445

(22) Filed: Sep. 20, 2007

(65) Prior Publication Data

US 2009/0083801 A1   Mar. 26, 2009

(51) Int. Cl.
*H04H 60/33* (2008.01)
*H04H 60/32* (2008.01)

(52) U.S. Cl.
USPC ......... 725/9; 725/14; 725/17; 725/19; 725/20

(58) Field of Classification Search
None
See application file for complete search history.

(56) References Cited

U.S. PATENT DOCUMENTS

| | | | |
|---|---|---|---|
| 6,094,239 A | 7/2000 | Weber | |
| 6,775,391 B2 | 8/2004 | Hosaka et al. | |
| 7,020,304 B2 | 3/2006 | Alattar et al. | |
| 7,738,673 B2 | 6/2010 | Reed | |
| 7,881,657 B2* | 2/2011 | Wang et al. | 455/3.02 |
| 2003/0085993 A1 | 5/2003 | Trimbee et al. | |
| 2003/0105639 A1 | 6/2003 | Naimpally et al. | |
| 2004/0008277 A1 | 1/2004 | Nagaishi et al. | |
| 2004/0025189 A1* | 2/2004 | Bauersachs et al. | 725/133 |
| 2005/0068462 A1 | 3/2005 | Harris et al. | |
| 2005/0120391 A1* | 6/2005 | Haynie et al. | 725/135 |
| 2006/0198559 A1* | 9/2006 | Manico et al. | 382/305 |
| 2006/0259926 A1* | 11/2006 | Scheelke et al. | 725/48 |
| 2007/0186228 A1* | 8/2007 | Ramaswamy et al. | 725/14 |
| 2007/0199018 A1* | 8/2007 | Angiolillo et al. | 725/39 |
| 2008/0300871 A1* | 12/2008 | Gilbert | 704/233 |
| 2009/0009532 A1* | 1/2009 | Hallberg | 345/636 |

FOREIGN PATENT DOCUMENTS

| | | | |
|---|---|---|---|
| EP | 1 686 796 A1 | | 8/2006 |
| JP | 3049381 | | 3/1991 |
| JP | 5130575 | | 5/1993 |
| JP | 2007027974 A | * | 2/2007 |
| KR | 100298413 B | | 5/2001 |

OTHER PUBLICATIONS

Ozawa, Takashi. JP 2007027974 A, English Translation (Feb. 2007).*
"Accessing Interactive Television: It's More than Meets the Eye," Tom Wlodkowski, 2001, 4 pps. www.csun.edu/cod/conf/2001/proceedings/0075wlodkowski.htm.
"Netgem I-Player Plus," Netgem, 2004, 8 pps. www.tvhelp.org.uk/audes/equipment/netgem.html.

* cited by examiner

*Primary Examiner* — Jason K Lin
(74) *Attorney, Agent, or Firm* — Fitch, Even, Tabin & Flannery LLP

(57) ABSTRACT

Audibly announcing program channels is provided upon the detection of a channel information display, such as a programming banner or graphical channel representation. In response to the channel information display being detected, data corresponding to the channel information display may be captured and parsed. Once speech data representative of the current program channel has been generated, an audible announcement of the program channel may be made to the user, thereby enabling visually impaired individuals to ascertain the currently selected program channel. In another embodiment, the broadcast network corresponding to the current program channel may also be identified and audibly announced with the current program channel.

2 Claims, 4 Drawing Sheets

SYSTEM AND METHOD FOR AUDIBLE CHANNEL ANNOUNCE

FIELD OF THE INVENTION

The present invention relates in general to providing channel information, and in particular to audibly announcing channel information.

BACKGROUND

Traditional television programming contains encoded channel information which is displayable on a television screen. Such information is most often contained in a so-called 'banner' that is displayed on a portion of the viewing screen whenever the user changes channels, or otherwise sends a command to the television or set top box (STB) requesting to view the channel information. This channel information includes at a minimum the numeric designation for the currently-selected television channel, and may also include network-specific information. Additional broadcast-related information may also be displayed in the banner along with the channel information. In analog television formats, such as NTSC, such additional information is encoded in the vertical blanking area (VBI). As television formats progress to all digital systems the VBI area is no longer utilized for carrying information. Digital systems enable information to be encoded in the picture frame user area as defined by MPEG standards.

However, visually impaired individuals who prefer to listen to television are unable to read such channel information when displayed. That is, while there are secondary audio program (SAP) receivers for providing so-called SAP audio over a separate channel, there is currently no convenient way for a visually impaired individual to ascertain the selected channel itself, following a channel change for example. As such, there is a need in the art for a system and method for audible channel announcement.

BRIEF SUMMARY OF THE INVENTION

Disclosed and claimed herein are systems and methods for audible channel announcing. In one embodiment, a method includes detecting channel information corresponding to a current program channel, and capturing, in response to said detecting, the channel information. The method further includes parsing the channel information to determine the current program channel, and providing an audible announcement of the current program channel.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Disclosure Overview

Figure 1:
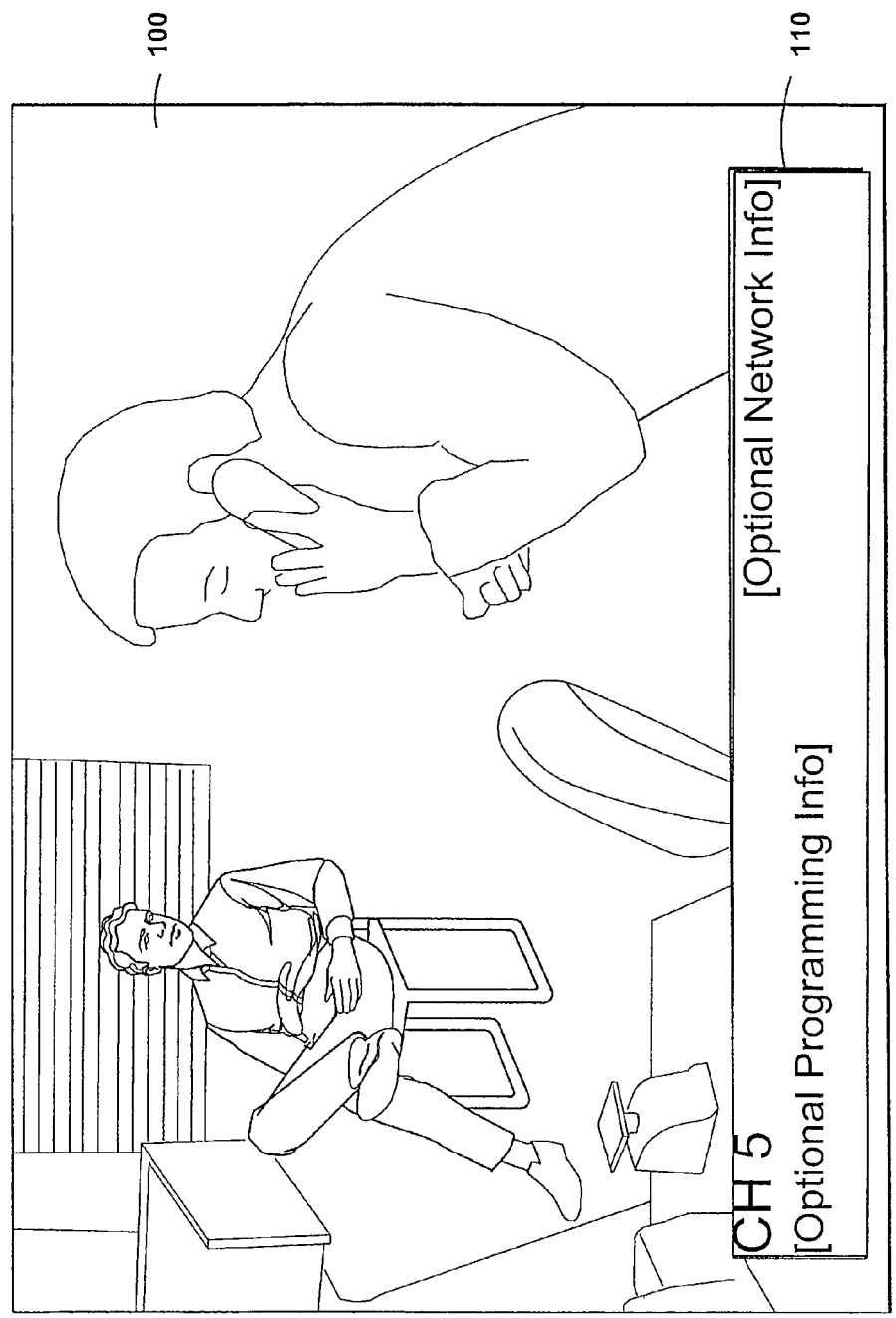
FIG. 1 depicts one embodiment of a television display of the prior art.

One embodiment of the invention is directed to a television system and method in which the displaying of a channel information display, such as a programming banner or graphical channel representation, is detected. In one embodiment, this detection may be performed on a continuous basis, or may otherwise be initiated upon receiving a user channel change request or channel information request.

In response to the channel information display being detected, data corresponding to the channel information display may be captured and parsed. In one embodiment, this parsing operation may comprise identifying the portion of the channel information display which contains the current program channel, and then performing a text-to-speech translation on the identified current program channel character(s). In another embodiment, an optical character recognition (OCR) operation may be performed on the entire channel information display, followed by a text-to-speech translation operation on the textual representation generated by the OCR operation which corresponds to the current program channel.

Once speech data representative of the current program channel has been generated, an audible announcement of the program channel may be made to the user, thereby enabling visually impaired individuals to ascertain the currently selected program channel.

As will be described in more detail below, another aspect of the invention relates to identifying and audibly announcing the broadcast network corresponding to the current program channel.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium or transmitted by a computer data signal. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc.

Exemplary Embodiments

FIG. 1 illustrates a typical television screen 100 after a channel change or a channel information request has been made by the user. In particular, banner 110 is displayed for some predetermined period of time on the television screen 100. The banner 110 will contain, at a minimum, the current program channel (i.e., CH 5), but may also contain network information (e.g., broadcast network call letters) and/or programming information (e.g., program title, description, length of broadcast, etc.). However, heretofore the banner 110 has been incapable of indicating the current program channel in a perceptible way to the visually impaired.

Figure 2:
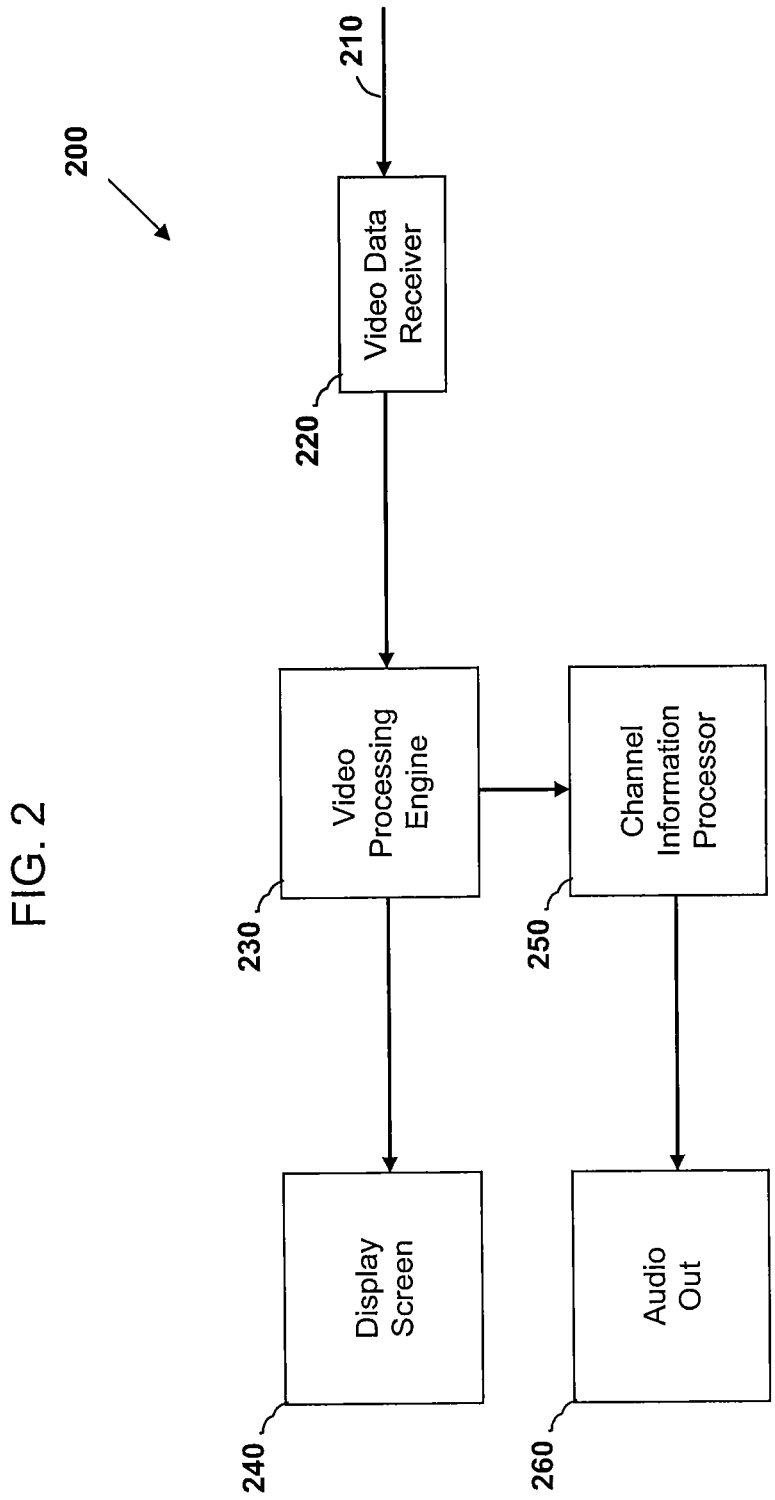
FIG. 2 depicts a system configured to carry out one or more embodiments of the invention.

To that end, FIG. 2 is a block diagram of a system 200 capable of implementing one or more aspects of the invention, including providing an audible channel announcement to a user. In one embodiment, system 200 is a television system. As shown, system 200 receives broadcast video data signal 210 into video data receiver 220. It should be appreciated that the broadcast video data signal 210 may be in any number of video formats (e.g., National Television Standards Committee (NTSC), PAL, Digital Satellite System (DSS), Digital Broadcast System (DBS), Advanced Television Standards Committee (ATSC), etc.).

Receiver 220 is configured to provide the broadcast video data signal 210 to a video processing engine 230. In one embodiment, the video processing engine 230 may be integrated with television processing circuitry, as is generally known in the art of television design. Once the broadcast video data signal 210 has been processed by the video processing engine 230, it may be rendered on or by the display screen 240, again as known in the art. It should be appreciated that the display screen 240 and corresponding video processing engine 230 may correspond to any known type of television, including but not limited to cathode-ray tube, rear projection, liquid crystal display, plasma, etc.

System 200 further comprises a channel information processor 250, which is shown coupled to the video processing engine 230. In one embodiment, the processor 250 may be configured to detect when a channel information display, such as a graphical programming banner (e.g., banner 110 of FIG. 1), is being (or will be) displayed on the display screen 240. As will be described in more detail below with reference to FIGS. 3 and 4, in response to this detection, the channel information processor 250 may capture and parse the channel information display in order to determine the current program channel.

While the channel information processor 250 is depicted as being coupled to the video processing engine 230, it should equally be appreciated that other configurations are possible, such as coupling the channel information processor 250 to the display screen 240, coupling the channel information processor 250 between the video processing engine 230 and the display screen 240, coupling the channel information processor 250 between the video data receiver 220 and the video processing engine 230, or integrating coupling the channel information processor 250 into the video processing engine 230.

Regardless of configuration, once the channel information processor 250 determines the current program channel it may provide a signal to the audio circuitry 260 for audibly announcing the current program channel to the user.

Figure 3:
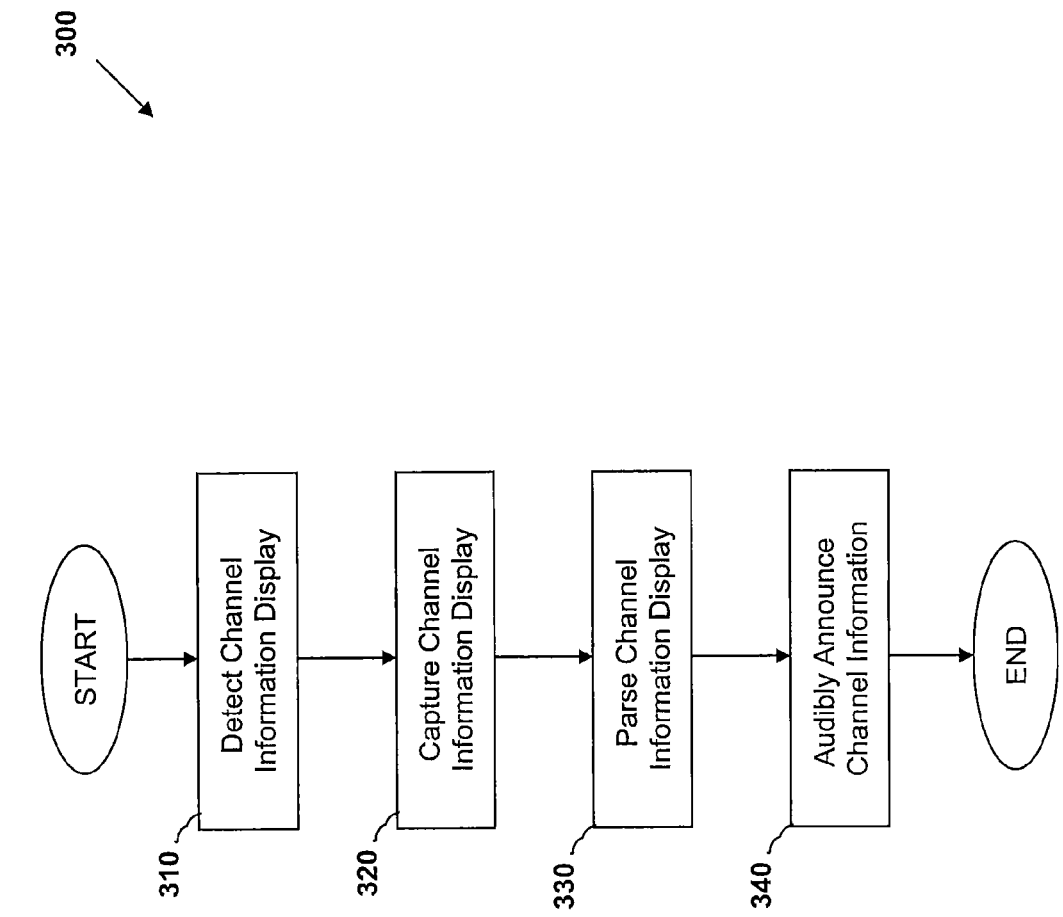
FIG. 3 is a process for carrying out one embodiment of the invention.

Referring now to FIG. 3, depicted is one embodiment of a process 300 for audibly announcing a current program channel. In one embodiment, process 300 may be carried out by a processor (e.g., channel information processor 250) in a television system.

In any event, process 300 begins at block 310 with the detection of channel information in a broadcast video signal. While in one embodiment the channel information may be contained in a graphical representation of the current program channel itself, in other embodiments it may include a graphical programming banner, such as banner 110 of FIG. 1. When the broadcast video signal is an analog signal, this detection operation may be based on detecting a discontinuous timing or momentarily black section in the received analog video signal. On the other hand, in the case of a digital video signal, this detection operation may be based on detecting an area in the digital video signal with relatively static contrast.

For digital video signals, the channel information to be detected at block 310 may be in the Program and System Information Protocol (PSIP) data decoded by the television, or possibly by a STB and then momentarily displayed on the television. As is known, PSIP is the protocol used in the ATSC digital television standard for carrying metadata about each channel in the broadcast transport stream of a TV station. In another embodiment, the channel information detected at block 310 may be in the form of a channel watermark disclosed on the television screen, typically in a corner of the display.

With respect to analog video signals, the channel information to be detected at block 310 may be contained in the vertical blanking interval (VEl) (e.g., CEA-608). In the case where the television performs the decoding, the channel information will be readily available and used for the momentary banner display. Alternatively where the STB performs the decoding, the VEl info may be passed through or stripped out, but in either case this becomes the momentarily displayed banner. Similarly, the channel information may be formatted as closed captioning information.

In the context of Internet Protocol (IP)-based television, there may not be any actual channels, but rather will have various so-called "providers" of content. These content providers may provide Extensible Markup Language (XML) data & specific descriptors to identify themselves and, as such, be the channel information detected at block 310.

Finally, it should equally be appreciated that any known method of detecting programming banners or any embedded text or other data in the video signal may be used at block 310 to detect the channel information display.

While in one embodiment, the detection operation of block 310 may be performed by continuously scanning the incoming broadcast video signal, in another embodiment, the detection operation of block 310 may be initialized or otherwise initiated upon receiving a user channel change request, or a user channel information request.

Once the channel information has been detected, process 300 may continue to block 320 where the data comprising the channel information may be captured. In one embodiment this may involve storing data representative of the channel information in a memory, such as random access memory, read only memory, flash memory, etc. This may be done since the channel information is typically only displayed for a finite period of time.

Once the channel information is captured or otherwise stored, process 300 may continue to block 330 where this channel information data may be parsed. In the case of an analog video signal, the parsing operation of block 330 may comprise identifying the portion of the channel information display which contains the current program channel. While numerous methods may be used to identify the portion of the channel information display which contains the current program channel, in one embodiment the channel information display data may be parsed line by line until characters which exhibit certain predetermined properties are located. In one embodiment, these predetermined properties may include characters in the form of one or more of: (1) a number, (2) a number from 1 to 3 digits long, (3) a number from 1 to 3 digits long which is not followed by or adjacent to a colon, period, comma or other punctuation, etc.

Once the portion of the channel information display containing the current program channel is identified, the parsing operation of block 330 may then further include performing a text-to-speech translation on the identified current program channel character(s). It should be appreciated that any known text-to-speech translation algorithm or methodology may be employed.

In the case of a digital video signal, on the other hand, the parsing operation of block 330 may involve performing an optical character recognition (OCR) operation on the entire channel information display. The OCR operation may include any known OCR algorithm or methodology which generates a textual representation of the channel information display, including the current program channel. As with the previous embodiment, certain inherent properties of all program channels may be used to identify the current program channel, after which a text-to-speech translation may be used based on the textual representation generated by the OCR operation.

It should of course be appreciated that the parsing operation of block 330 may depend on the form in which the channel information is available. Thus, depending on the manner in which the channel information is provided, the operation of block 330 may include parsing PSIP data, a channel watermark, a banner, VBI data, XML data, etc.

Once speech data representative of the current program channel has been generated using any of the aforementioned approaches, or any other known approach for that matter, process 300 continues to block 340 where an audible announcement of the program channel may be made to the user (e.g., using audio circuitry 260 of FIG. 2). In this fashion, visually impaired individuals are able to ascertain the current channel.

Figure 4:
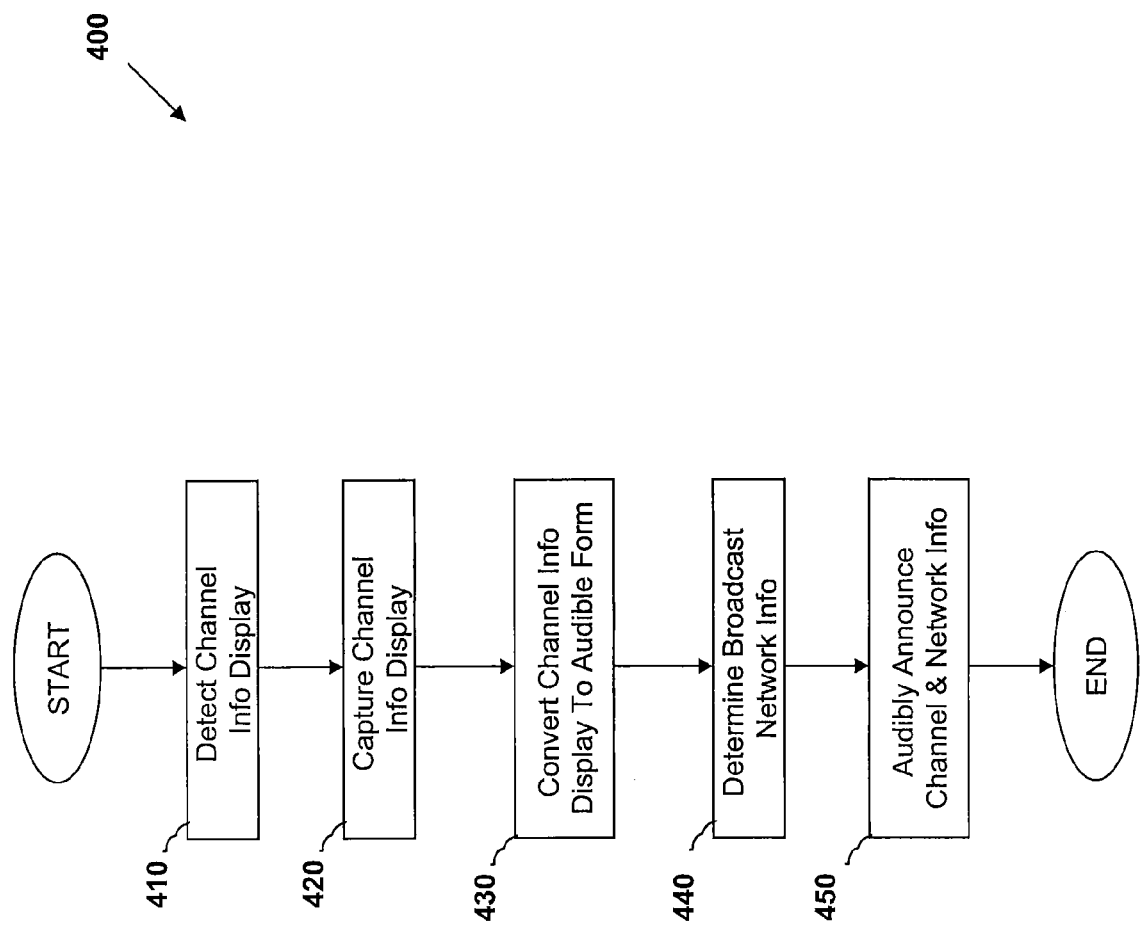
FIG. 4 is a process for carrying out another embodiment of the invention.

Referring now to FIG. 4, depicted is another embodiment of a process 400 for audibly announcing a current program channel. As with process 300 of FIG. 3, process 400 may be similarly carried out by a processor (e.g., channel information processor 250) in a television system.

Process 400 begins at block 410 with the detection of a channel information in a broadcast video signal. Thereafter, process 400 continues to block 420 where data comprising the channel information may be captured (e.g., stored in a memory). In one embodiment, the operations of blocks 410 and 420 are the same as blocks 310 and 320 respectively, as described above, and as such, the description set forth above for blocks 310 and 320 is equally applicable to blocks 410 and 420.

Once the channel information is captured or otherwise stored, process 400 may continue to block 430 where this channel information data may be converted to an audible form. In one embodiment, this may involve performing a text-to-speech translation on a portion of the channel information data which has been identified as the current program channel. In the case of an analog video signal, this portion may be identified by parsing the channel information data line by line until characters which exhibit certain predetermined properties are located, as described above with reference to FIG. 3. In the case of a digital video signal, an OCR operation using any known OCR methodology may be used to generate a textual representation of the channel information, including the current program channel. The text-to-speech translation may then be performed on the current program channel.

In the embodiment of FIG. 4, process 400 continues to block 440 where the identity of the broadcast network corresponding to the current program channel may be determined. Since program channels tend to be different for different service providers, the location of the viewer is needed to determine the broadcast network which corresponds to the current program channel. Since there is typically only one service provider for a given location, the location information may be used to identify the service provider, which may in turn be used to identify the broadcast network which corresponds to the current program channel.

While it should be appreciated that numerous methods may be used to identify the location of the viewer, in one embodiment this information may be manually entered by the viewer (e.g., entering a zip code). In another embodiment where the process 400 is performed by a system/device that is connected to the Internet, the assigned Internet Protocol (IP) address may be used to identify the user's location. In any event, once this location information is ascertained, the service provider that is publicly known to service that area may be readily determined. This may involve performing a lookup operation using the location information (e.g., zip code) of a table containing all of the known service providers listed according to the areas they service.

Once the service provider has been identified, a second lookup operation may be performed using, for example, a table containing, for each service provider, the identity (or call letters) of the broadcast networks corresponding to the individual program channels. The result of the operation of block 440 is the name (or call letters) of the current broadcast network.

At this point, process 400 may continue to block 450 where an audible announcement of both the program channel and the broadcast network may be made to the user (e.g., using audio circuitry 260 of FIG. 2). In this fashion, visually impaired individuals are able to ascertain the current selected channel, as well as the broadcast network associated with that channel.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:
1. A processor-implemented method for audible channel announcement comprising:
using a processor:

detecting displayed channel information corresponding to a current program channel decoded for display by a display screen;

wherein when the broadcast video is an analog signal, the detecting is based on detecting a discontinuous timing or momentarily black section in the analog video signal; and wherein when the broadcast video signal is a digital video signal, the detecting is based on detecting data corresponding to the channel information in a channel watermark in an area of the digital video signal with relatively static contrast;

capturing, in response to said detecting, the channel information;

parsing the channel information to determine the current program channel by:
  performing parsing line by line until characters which exhibit certain predetermined properties are located, when the broadcast signal is an analog signal,
  performing an optical character recognition operation on the channel watermark to generate a textual representation of the current program channel, when the broadcast signal is a digital video signal and
  performing a text-to-speech translation using the textual representation; and providing an audible announcement of at least one of the current program channel and network information, based on the text-to-speech translation, to a visually impaired user, wherein the network information includes a broadcast network identity that corresponds to the current program channel and that is determined by a user location and by a service provider identity;

wherein detecting the channel information comprises detecting data corresponding to the channel information in closes captioning data.

2. A system for audible channel announcement comprising:

a video data receiver configured to receive broadcast programming; and a processor electrically coupled to the video data receiver, the processor configured to:

detect displayed channel information corresponding to a current program channel decoded for display by a display screen;

wherein when the broadcast video is an analog signal, the detection is based on detecting a discontinuous timing or momentarily black section in the received analog video signal; and wherein when the broadcast video signal is a digital video signal, the detecting is based on detecting data corresponding to the channel information in a channel watermark in an area of the digital video signal with relatively static contrast;

capture, in response to detecting, the channel information;

parse the channel information to determine the current program channel by:
  performing parsing line by line until characters which exhibit certain predetermined properties are located, when the broadcast signal is an analog signal,
  performing an optical character recognition operation on the channel watermark to generate a textual representation of the current program channel, when the broadcast signal is a digital video signal and
  performing a text-to-speech translation using the textual representation; and provide an audible announcement of at least one of the current program channel and network information, based on the text-to-speech translation, wherein the network information includes a broadcast network identity that corresponds to the current program channel and that is determined by a user location and by a service provider identity;

wherein the processor is configured to detect the channel information by detecting data corresponding to the channel information in closed captioned data.

* * * * *